United States Patent [19]

Kawanabe

[11] Patent Number: 4,998,003

[45] Date of Patent: Mar. 5, 1991

[54] ELECTRICAL DISCHARGE WIRE-CUTTING MACHINE

[75] Inventor: Tasuku Kawanabe, Nagoya, Japan

[73] Assignee: Brother Kogyo Kabushiki Kaisha, Japan

[21] Appl. No.: 402,534

[22] Filed: Sep. 5, 1989

[30] Foreign Application Priority Data

Sep. 5, 1988 [JP] Japan ............................ 63-116724[U]

[51] Int. Cl.$^5$ ............................................. B23H 7/10
[52] U.S. Cl. .................................................. 219/69.12
[58] Field of Search ........................... 219/69.12, 69.13; 242/57; 364/474.04

[56] References Cited

U.S. PATENT DOCUMENTS

| | | | |
|---|---|---|---|
| 3,663,806 | 5/1972 | Draukhan et al. | 242/57 |
| 3,994,449 | 11/1976 | Wales | 242/57 |
| 4,463,913 | 8/1984 | Sato | 242/57 |
| 4,581,514 | 4/1986 | Inoue | 219/69.13 |

FOREIGN PATENT DOCUMENTS

| | | | |
|---|---|---|---|
| 58-28428 | 2/1983 | Japan | 219/69.12 |
| 169225 | 7/1988 | Japan | 219/69.12 |

Primary Examiner—Geoffrey S. Evans
Attorney, Agent, or Firm—Oliff & Berridge

[57] ABSTRACT

The speed at which a wire electrode moves is detected, and the speed at which a wire supply bobbin supplying the wire electrode rotates is also detected. Parameters representing the shape of the wire supply bobbin and the type of the wire electrode and indicating the relationship between the diameter of the winding of the wire electrode on the wire supply bobbin and the length of the wire electrode on the wire supply bobbin, are stored in a memory. The present diameter of the winding of the wire electrode on the wire supply bobbin is calculated based on the detected speeds, and the remaining length of the wire electrode on the wire supply bobbin is also calculated based on the calculated remaining length or information corresponding to the calculating remaining length is then displayed. Whether a machining process to be effected on the workpiece can be completed with the present wire supply bobbin is determined and displayed.

12 Claims, 3 Drawing Sheets

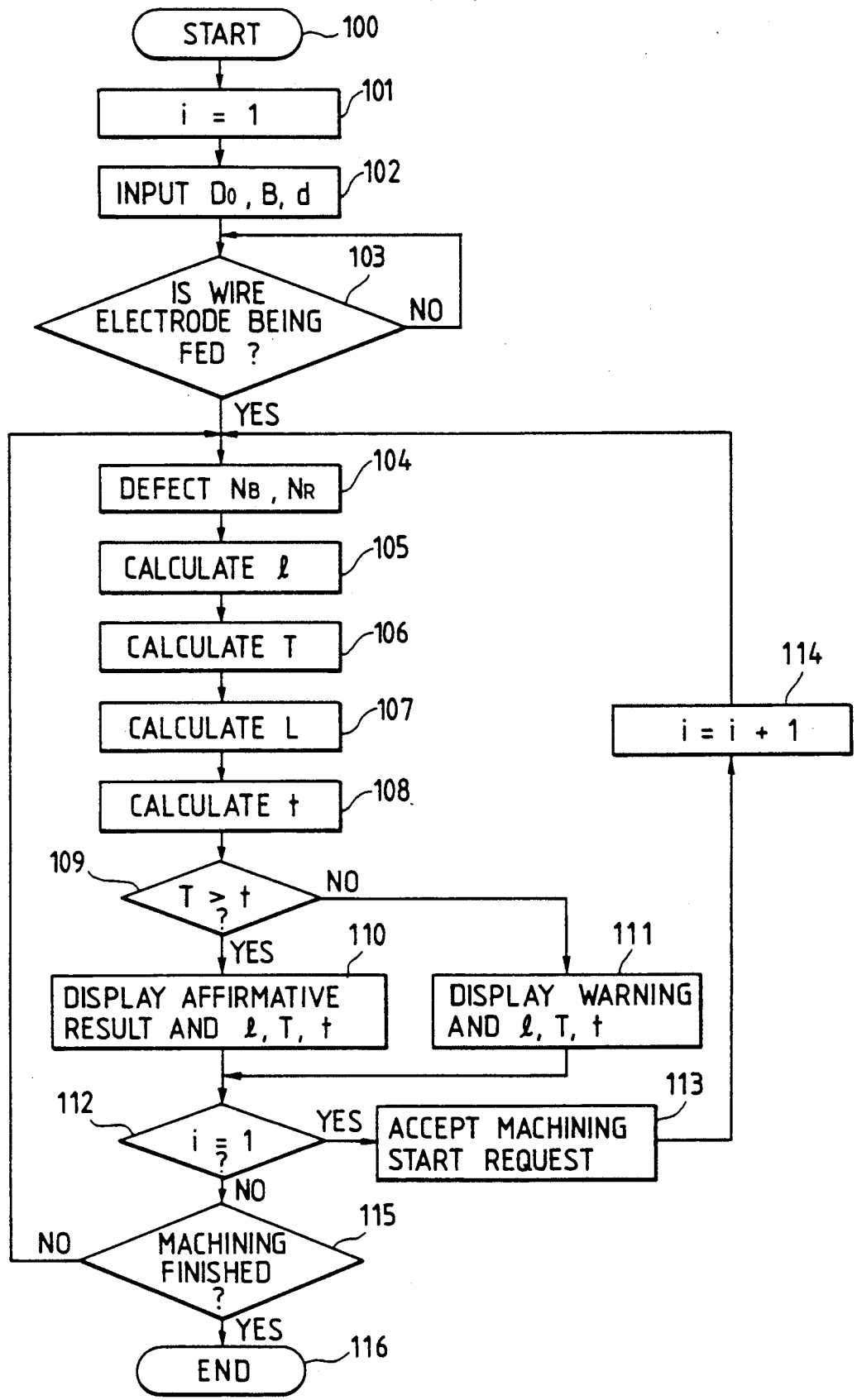

ELECTRICAL DISCHARGE WIRE-CUTTING MACHINE

BACKGROUND OF THE INVENTION

The present invention relates to an electrical discharge wire-cutting machine, and more particularly to an electrical discharge wire-cutting machine having a means for detecting the remaining length of a wire electrode.

Japanese Laid-Open Patent Publication No. 60-197320 discloses an electrical discharge wire-cutting machine having a device for detecting the remaining length of a wire electrode. More specifically, when a new wire supply bobbin is installed in place, the operator sets the amount by which a wire electrode is wound on the wire supply bobbin. The device calculates and displays the remaining length of the wire electrode by subtracting the length consumed as an electrical discharge process progresses from the initial length of the wire electrode which is calculated from the value set by the operator.

The disclosed device, however, does not directly detect the remaining length of the wire electrode, but essentially detects the consumed length of the wire electrode. Therefore, the more the wire electrode is consumed and the smaller the remaining length become, the more detecting errors are accumulated, so that the calculated remaining length of the wire electrode is subjected to a greater error. The wire supply bobbin installed on the electrical discharge wire-cutting machine may not necessarily be brandnew, but may be a used wire supply bobbin. If a used wire supply bobbin is installed, its weight must be measured, and the initial amount by which the wire electrode is wound thereon must be set by the operator. This process is tedious and time consuming.

SUMMARY OF THE INVENTION

It is an object of the present invention to provide an electrical discharge wire-cutting machine capable of directly detecting the remaining length of a wire electrode wound around a wire supply bobbin and displaying the remaining wire length accurately.

Another object of the present invention is to provide an electrical discharge wire-cutting machine which can automatically determine, without relying upon the experience or skill of the operator, whether a machining process about to be carried out on the electrical discharge wire-cutting machine can be completed with the remaining length of a wire electrode on a wire supply bobbin presently installed in place.

According to the present invention, there is provided an electrical discharge wire-cutting machine for machining a workpiece with an electrical discharge produced by applying a voltage between the workpiece and a wire electrode while keeping the wire electrode taut and feeding the wire electrode at a speed, the wire electrode being wound around and supplied from a wire supply bobbin at a speed determined in accordance with rotations of the wire supply bobbin, the workpiece being machined in accordance with a machining program, the wire-cutting machine comprising a first detector for detecting the feeding speed of the wire electrode, a second detector for detecting a rotational speed of the wire supply bobbin, memory means for storing parameters required for determining a length of the wire electrode remaining on the wire supply bobbin as the wire electrode is being supplied from the wire supply bobbin, first calculating means for calculating the length of the wire electrode remaining on the wire supply bobbin based on the speeds detected by the first and second detectors, and the parameters stored in the memory means, and producing first information regarding the remaining length of the wire electrode, and display means for displaying the first information produced from the first calculating means.

The electrical discharge wire-cutting machine further comprises second calculating means for calculating a period of time required for completing the machining of the workpiece based on the machining program, third calculating means for calculating a period of time during which the workpiece is machined with the length of the wire electrode remaining on the electrode supply bobbin, comparison means for comparing the period of time calculated by the second calculating means with the period of time calculated by the third calculating means, and outputting second information regarding a result of comparison, and wherein the display means further displays the second information outputted from the comparison means.

The parameters represent a shape of the wire supply bobbin and a cross-sectional area of the wire electrode. Specifically, the wire supply bobbin has a rotatable cylindrical portion around which the wire electrode is superposedly wound over a predetermined width of the cylindrical portion with a predetermined winding density, the cylindrical portion having a circular cross-section of a first predetermined diameter, the wire electrode having a circular cross-section of a second predetermined diameter, and wherein the parameters include the predetermined width, the predetermined winding density, the first predetermined diameter, the second predetermined diameter, and a number of turns the wire electrode is superposedly wound around the cylindrical portion.

With the electrical discharge wire-cutting machine thus constructed, the consumed length of the wire electrode is not detected, but the diameter of the winding of the wire electrode on the wire supply bobbin which is presently installed is calculated, and the remaining length of the wire electrode on the wire supply bobbin is calculated based on the calculating winding diameter and the stored parameters. The remaining length of the wire electrode may directly be displayed, or other information, such as a time in which the workpiece can be machined with the remaining wire electrode length may be displayed instead.

The time required for completing the machining process, obtained by scanning and analyzing an NC machining program, and the time in which the workpiece can be machined, obtained from the remaining length of the wire electrode on he wire electrode bobbin, are compared with each other to determine whether the machining process can be completed with the wire electrode left on the present wire supply bobbin.

The above and other objects, features and advantages of the present invention will become more apparent from the following description when taken in conjunction with the accompanying drawings in which preferred embodiments are shown by way of illustrative examples.

BRIEF DESCRIPTION OF THE DRAWINGS

FIG. 4 is a flowchart of a processing sequence to be executed by a CPU in the detecting device.

DETAILED DESCRIPTION OF THE PREFERRED EMBODIMENTS

Figure 1:
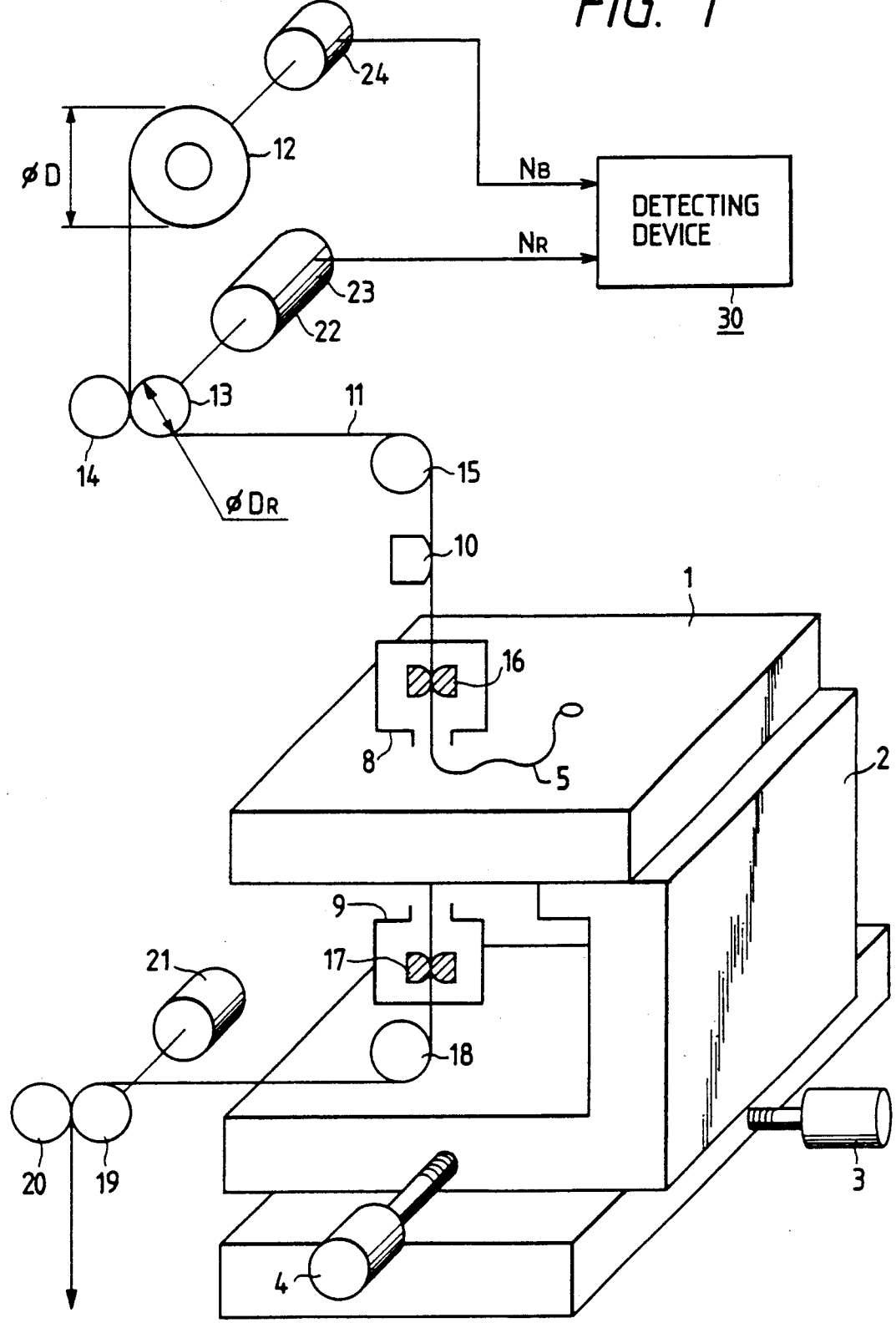
FIG. 1 is a schematic perspective view of an electrical discharge wire-cutting machine according to the present invention.

As shown in FIG. 1, an electrical discharge wire-cutting machine includes a table 2 for securely supporting a workpiece 1 to be machined, the table 2 being horizontally movable while being guided by a guide structure (not shown). The table 2 is movable relative to a wire electrode 11 by an X-axis servomotor 3 and a y-axis servomotor 4.

The wire electrode 11 is guided to run vertically by means of a pair of upper and lower wire die-shaped wire guides 16, 17 positioned above and below the workpiece 1. The wire guides 16, 17 are associated with respective nozzles 8, 9 for ejecting a machining solution axially along the wire electrode 11 to generate an intensive machining solution flow in a machined gap 5 defined in the wOrkpiece A power feeder 10 is held in sliding contact with the wire electrode 11. A pulsating voltage is applied from a power supply (not shown) through the power feeder 10 to the wire electrode 11. The pulsating voltage thus applied generates an electrical discharge between the wire electrode 11 and the workpiece 1 for thereby machining the workpiece 1.

The wire electrode is unreeled from a wire supply bobbin 12, passes between a tensIon roller 13 and a pinch roller 14, and extends around an upper guide roller 15 into sliding contact with the power feeder. The wire electrode 11 extends through the upper and lower wire guides 16, 17 to a lower guide roller 18, from which the wire electrode passes between a wire drive roller 19 and a pinch roller 20, and is wound around a takeup bobbin (not shown). The wire driver roller 19 is coupled to a wire drive roller 21 so that the roller 19 is rotated at a predetermined speed. The upper tension roller 18 is coupled to a brake motor 22 which imposes a prescribed torque on the roller 18. The wire electrode 11 between the upper and lower wire guides 16, 17 is tensioned and kept taut vertically by the wire drive roller 19 and the tension roller 13. The foregoing structure of the electrical discharge wire-cutting machine is of a conventional nature.

According to the present invention, an encoder 23 for detecting the rotational speed of the tension roller 13 is coupled to the tension roller 13. The encoder 23 serves as a detector for detecting the speed of travel of the wire electrode 11. Another encoder 24, which serves as a detector for detecting the rotational speed of the wire supply bobbin 12, is coupled to the wire supply bobbin 12. Signals from these two encoders 23, 24 are applied to a device 30 for detecting the remaining length of the wire electrode 11.

Figure 2:
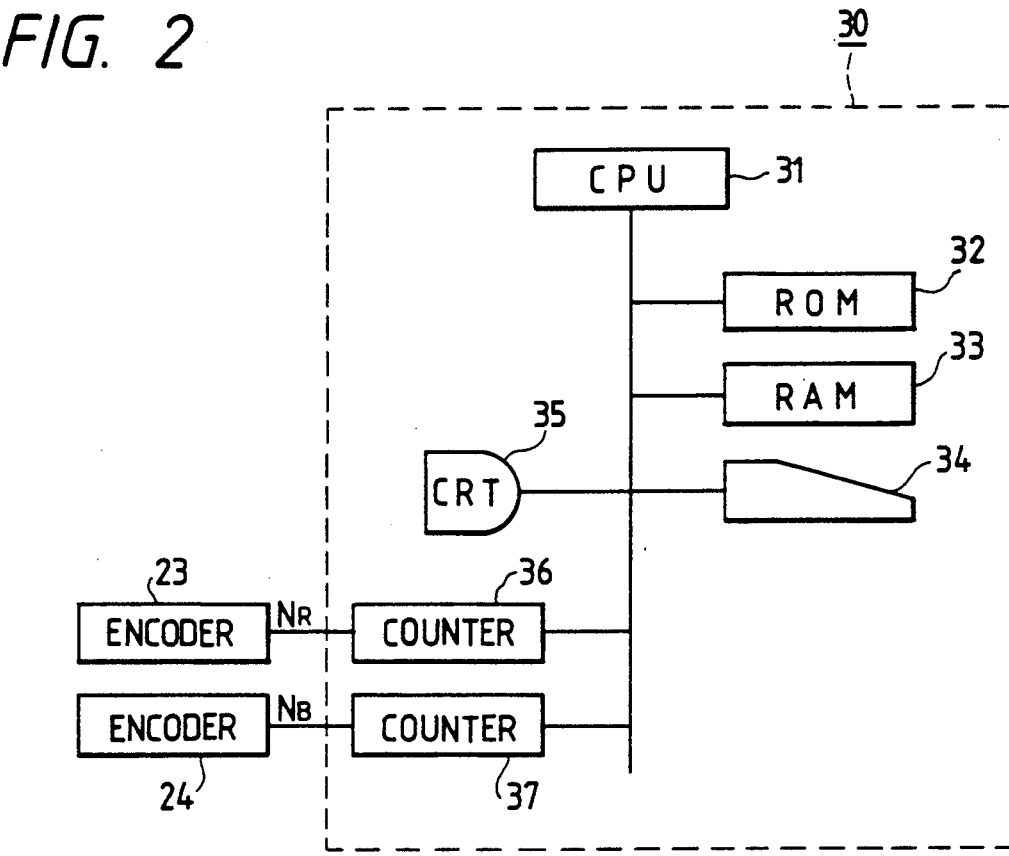
FIG. 2 is a block diagram of a device for detecting the remaining length of a wire electrode.

FIG. 2 shows in block form the detecting device 30. The detecting device 30 comprises a central processing unit (CPU) 31, a ROM 32, a RAM 33, a keyboard 34 serving as a data input means, a CRT display 35, and a pair of counters 36, 37 for counting the signals from the encoders 23, 24, respectively. These hardware components of the detecting device 30 are not independently provided, but are shared by the hardware of an NC system which controls the entire operation of the electrical discharge wire-cutting machine. The function of the detecting device 30 is performed by a processing sequence which is executed in the idle time of the control sequence for the electrical discharge wire-cutting machine. The CPU 31 detects the rotational speed $N_R$ of the tension roller 13 and the rotational speed $N_B$ of the wire supply bobbin 12 based on increments of the counts of the counters 36, 37 per unit time, and calculates the remaining length of the wire electrode 11 based on these two rotational speeds $N_R$, $N_B$.

A process of calculating the remaining wire length will be described below.

Figure 3:
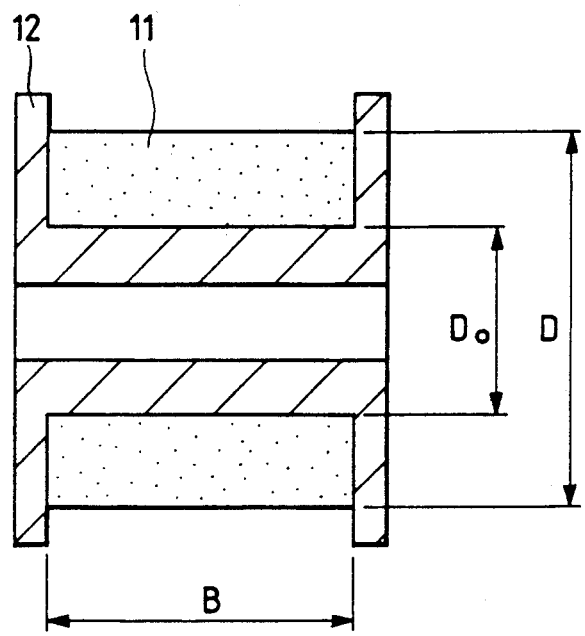
FIG. 3 is an axial across sectional view of a wire supply bobbin.

FIG. 3 shows the wire supply bobbin 12 in cross section. The wire supply bobbin 12 includes a bobbin shaft having a diameter $D_O$ and a flange-to-flange length or winding width B. The winding of the wire electrode 11 has an outside diameter D. If it is assumed in FIGS. 1 and 3 that the tension roller 13 has a diameter $D_R$, the tension roller 13 rotates at a speed $N_R$, and the wire supply bobbin 12 rotates at a speed $N_B$, then the speed f at which the wire electrode 11 is supplied from the wire supply bobbin 12 is given by:

$$f = \pi D N_B = \pi D_R N_R \quad (1)$$

Therefore, the diameter D of the wire winding on the wire supply bobbin 12 is calculated as follows:

$$D = D_R \times N_R / N_B \quad (2)$$

Given the winding diameter D, the length l of the wire electrode 11 wound on the wire supply bobbin 12 is given by the following equation:

$$l = \eta \times (D^2 - D_O^2) B / d^2 \quad (3)$$

where d is the diameter of the wire electrode 11 and $\eta$ is the winding density of the wire electrode 11. The winding density $\eta$ is of a fixed value depending on the type of the wire electrode 11, and normally ranges from 0.4 to 0.7. From equations (2) and (3), the remaining length of the wire electrode 11 is expressed as follows:

$$l = \eta \{(D_R \times N_R / N_B)^2 - D_O^2\} B / d^2 \quad (4)$$

Therefore, by storing the parameters depending on the shape of the wire supply bobbin 12, i.e., the winding width B and the bobbin shaft diameter $D_O$, and the parameters depending on the type of the wire electrode 11, i.e., the wire diameter d and the winding density $\eta$, the present remaining length l of the wire electrode 11 can be calculated according to equation (4) from the rotational speed $N_R$ of the tension roller 13 and the rotational speed $N_B$ of the wire supply bobbin 12, which are detected by the encoders 23, 24.

Now, a process of determining whether the machining of the workpiece 1 can be completed with the remaining wire length l or not will be described below.

A time T in which the workpiece 1 can be machined when the remaining length l of the wire electrode 11 is consumed at the wire supply speed of which is set at the time given by the following equation:

$$T = l/f \tag{5}$$

$$T = \eta \times \frac{\{(D_R N_R/N_B)^2 - D_0^2\} \times B}{\pi D_R N_R d^2}$$

From the NC machining program stored in the RAM 33, the remaining length L of the machining path can be defined as follows:

$$L = (L - \Delta L) + \Sigma L_i \tag{6}$$

where i is the block number of the NC machining program (i = 1 (one) through m), $L_i$ is the length of the machining path of the with block, and $\Delta L$ is the length of the machining path which has already been machined in the n-th block presently in operation. From equation (6) and an average feed speed V in the preset machining conditions, a time t required to complete the machining process is given by:

$$t = L/V \tag{7}$$

Therefore, in order to machining the workpiece 1 up to the final machining point with the remaining length of the wire electrode 11 on the wire supply bobbin 12 now in use, the following inequality must be met:

$$T > t \tag{8}$$

Consequently, it can be determined from equation (8) whether the machining is completed with the present wire supply 12 or not. electrode 11 and determines whether the machining can be completed with the remaining wire length according to the above calculation processes, and displays the results of the calculations on the CRT display 35.

FIG. 4 shows an processing sequence executed by the CPU 31 in the detecting device 30. The processing sequence is performed in the idle time of the control operation of the electrical-discharge wire-cutting machine such as for controlling the X-axis servomotor 3, the y-axis servomotor 4, and other components.

When the processing sequence is started (100), an item i is initially set to "1" in a step 101, and then the shaft diameter $D_O$ and winding width B of the wire supply bobbin 12 and the diameter d of the wire electrode 11 are entered from the keyboard 34 in a step 102. The data $D_O$, B, d of the entered parameters are stored in the RAM 33.

Since the shape of the wire supply bobbin 12 is standardized, bobbin identification symbols P-1, P-3, P-5, etc. may be entered rather than the numeral values of the shaft diameter $D_O$, the winding width B, and the diameter d. In this case, the CPU 31 looks for the values of the shaft diameter $D_O$ and the winding width B for a used bobbin identification symbol from the following table stored in the ROM 32:

TABLE

| BOBBIN NO. | (Unit: mm) | | |
| --- | --- | --- | --- |
| | P-1 | P-2 | P-5 |
| DIAMETER $D_o$ | 50 | 80 | 90 |
| WIDTH B | 70 | 90 | 90 |

Then, a step 103 determines whether the wire drive motor 21 and the brake motor 22 are energized, and the step 103 is repeated until the wire electrode 11 starts being fed. When the electrode 11 starts traveling, control goes to a step 104.

In the step 104, the rotational speed $N_B$ of the wire supply bobbin 12 and the rotational speed $N_R$ of the tension roller 13 are detected from the counts of the counters 36, 37. Then, the remaining length l of the wire electrode 11 is calculated according to the equation (4) in a step 105, using the winding density $\eta$ and the tension roller diameter $D_R$, which are stored in the ROM 32, and the shaft diameter $D_O$, the winding width B, and the wire diameter d which have been entered through the keyboard 34 and stored in the RAM 33. The time T in which a machining process can be performed on the workpiece is then calculated according to the equation (5) in a step 106. The NC machining program stored in the RAM 33 is scanned and analyzed, after which the remaining length L of the machining path is calculated according to the equation (6) in a step 107, and the time t required for the machining process is calculated according to the equation (7) in a step 108.

Then, a step 109 compares the time T in which the machining process is possible and the time t required for the machining process. If the time T is longer the time t, then control goes to a step 110 in which it is displayed on the CRT display 35 that the machining process can be completed and also the present remaining length l of the wire electrode 11, the time T, and the time t are displayed on the CRT display 35. If the time T is shorter than the time t, then control goes to a step 111 in which a warning is displayed indicating that the machining process cannot be completed with the present remaining wire length and the remaining length l and the times T, t are displayed.

A step 112 determines whether the present processing is the first processing by checking if the value of the item i is "1" or not. If it is the first processing, then control proceeds to a step 113 in which a machining start request is accepted. The operator can therefore confirm, based on the information displayed on the CRT display 35, whether the remaining length of the wire electrode 11 on the wire supply bobbin 12 is appropriate or not before a machining process is started. The item i is then incremented in a step 114 from which control goes back to the step 104.

Subsequently, the steps 104 through 115 are repeatedly executed. The remaining wire length and the machining completion capability are displayed on the CRT display 35 in each of the repeated cycles. When the machining of the workpiece 1 is finished, control goes from a step 115 to a step 116 in which the processing sequence is brought to an end.

With the present invention, as described above, since the present remaining wire length is directly detected base on the rotational speed of the wire supply bobbin and the speed of travel of the wire electrode, the present remaining length of the wire electrode left on the wire supply bobbin can accurately be detected and displayed.

Whether the workpiece can be machined to the final machining point with the wire electrode available on the wire supply bobbin is determined and displayed before an electrical-discharge wire-cutting process is started. Consequently, a machine shutdown which would otherwise occur when it would run out of the wire electrode during a machining process is prevented in advance.

Although a certain preferred embodiment has been shown and described, it should be understood that many changes and modifications may be made therein without departing from the scope of the appended claims. For example, although in the foregoing embodiment, the feeding speed of the wire electrode is detected from the rotational speed of the tension roller, it may directly be detected with, for example, a sensor disposed alongside the feeding path of the wire electrode.

What is claimed is:

1. An electrical discharge wire-cutting machine for machining a workpiece with an electrical discharge produced by applying a voltage between the workpiece and a wire electrode while keeping the wire electrode taut and feeding the wire electrode at a speed, the wire electrode being wound around and supplied from a wire supply bobbin at a speed determined in accordance with rotations of the wire supply bobbin, the workpiece being machined in accordance with a machining program, the wire-cutting machine comprising:
    a first detector for detecting the feeding speed of the wire electrode;
    a second detector for detecting a rotational speed of the wire supply bobbin, the feeding speed of the wire electrode and the rotational speed of the wire supply bobbin being detected at substantially the same time;
    memory means for storing parameters required for determining a length of the wire electrode remaining on the wire supply bobbin as the wire electrode is being supplied from the wire supply bobbin;
    first calculating means for calculating the length of the wire electrode remaining on the wire supply bobbin based on the speeds detected by said first and second detectors, and the parameters stored in said memory means, and producing first information regarding the remaining length of the wire electrode; and
    display means for displaying the first information produced from said first calculating means.

2. An electrical discharge wire-cutting machine according to claim 1, further comprising:
    second calculating means for calculating a period of time required for completing the machining of the workpiece based on the machining program;
    third calculating means for calculating a period of time during which the workpiece is machined with the length of the wire electrode remaining on the electrode supply bobbin;
    comparison means for comparing the period of time calculated by said second calculating means with the period of time calculated by said third calculating means, and outputting second information regarding a result of comparison; and
    wherein said display means further displays the second information outputted from said comparison means.

3. An electrical discharge wire-cutting machine according to claim 1, wherein the parameters represent a shape of the wire supply bobbin and a cross-sectional area of the wire electrode.

4. An electrical discharge wire-cutting machine according to claim 3, wherein the wire supply bobbin has a rotatable cylindrical portion around which the wire electrode is superposedly wound over a predetermined width of the cylindrical portion with a predetermined winding density, said cylindrical portion having a circular cross-section of a first predetermined diameter, the wire electrode having a circular cross-section of a second predetermined diameter, and wherein the parameters include the predetermined width, the predetermined winding density, the first predetermined diameter, the second predetermined diameter, and a number of turns the wire electrode is superposedly wound around the cylindrical portion.

5. An electrical discharge wire-cutting machine according to claim 1, further comprising a tension roller rotatingly imparting a tension to the wire electrode, and wherein said first detector includes an encoder for detecting a rotational speed of the tension roller.

6. An electric discharge wire-cutting machine according to claim 1, wherein said second detector including an encoder connected to the wire supply bobbin.

7. An electrical discharge wire-cutting machine for machining a workpiece with an electrical discharge produced by applying a pulsating voltage between the workpiece and a wire electrode while keeping the wire electrode taut and feeding the wire electrode at a speed through a tension roller which has a diameter $D_R$ and rotates at a speed in accordance with the feeding speed of the wire electrode, the wire electrode having a cross-sectional diameter d and being wound around a wire supply bobbin at a winding density $\eta$ and supplied therefrom at a speed of the wire supply bobbin, the wire supply bobbin including a bobbin shaft having a diameter $D_O$ and a winding width B, the workpiece being machined in accordance with a machining program, the wire-cutting machine comprising:
    a first detector for detecting the rotational speed of the tension roller and producing a first signal $N_R$ indicative of the detected rotational speed of the tension roller;
    a second detector for detecting the rotational speed of the wire supply bobbin and producing a second signal $N_B$ indicative of the detected rotational speed of the wire supply bobbin;
    first display means for displaying data regarding a length of the wire electrode remaining on the wire supply bobbin;
    input means for inputting parameters including the diameter of the tension roller, the diameter and the winding width of the bobbin shaft, the cross-sectional diameter of the wire electrode, and the winding density of the wire electrode on the wire supply bobbin; and
    first calculating means for calculating a remaining wire length l wound on the wire supply bobbin based on the first signal, the second signal and the parameters inputted by said input means in accordance with the following equation:

$$l = \eta[(D_R \cdot N_R/N_B)^2 - D_O^2]B/d^2.$$

8. An electrical discharge wire-cutting machine according to claim 7, further comprising:
    second calculating means for calculating a machining duration from the machining program upon scanning the machining program prior to executing said machining program;
    third calculating means for calculating the machining duration of the remaining wire length wound on the wire supply bobbin based on the remaining wire length calculated by said first calculating means;
    decision means for deciding if the machining can be completed with the remaining wire length wound on the wire supply bobbin upon comparing the machining duration calculated by said third calculating means with the machining duration calculated by said second calculating means and outputting information regarding a result of the decision; and second display means for displaying the information outputted by said decision means.

9. An electrical discharge wire-cutting machine according to claim 7, wherein said first calculating means comprises a central processing unit.

10. An electrical discharge wire-cutting machine according to claim 8, wherein said second calculating means comprises a central processing unit.

11. An electrical discharge wire-cutting machine according to claim 8, wherein said third calculating means comprises a central processing unit.

12. An electrical discharge wire-cutting machine according to claim 8, wherein said decision means comprises a central processing unit.

* * * * *